United States Patent [19]

Pfaffenberger

[11] Patent Number: 5,520,044

[45] Date of Patent: May 28, 1996

[54] BEARING FREE SPRING FREE THROTTLE POSITION SENSOR

[75] Inventor: David S. Pfaffenberger, Mishawaka, Ind.

[73] Assignee: CTS Corporation, Elkhart, Ind.

[21] Appl. No.: 411,047

[22] Filed: Mar. 27, 1995

Related U.S. Application Data

[62] Division of Ser. No. 82,140, Jun. 23, 1993, Pat. No. 5,460,035.

[51] Int. Cl.$^6$ .................................................. G01M 15/00
[52] U.S. Cl. .......................................... 73/118.1; 338/197
[58] Field of Search ................................ 73/118.1; 29/595, 29/613; 338/68, 99, 197, 199, 184, 190, 192, 196, 163, 197

[56] References Cited

U.S. PATENT DOCUMENTS

| | | | |
|---|---|---|---|
| 3,303,453 | 2/1967 | Doering, Jr. | 338/184 |
| 4,430,634 | 2/1984 | Hufford et al. . | |
| 4,616,504 | 10/1986 | Overcash et al. . | |
| 4,621,250 | 11/1986 | Echasseriau et al. . | |
| 4,649,367 | 3/1987 | Biermann et al. . | |
| 4,672,356 | 6/1987 | Biermann et al. . | |
| 4,688,420 | 8/1987 | Minagawa . | |
| 4,693,111 | 9/1987 | Arnold et al. . | |
| 4,703,649 | 11/1987 | Eitoku et al. . | |
| 4,715,220 | 12/1987 | Eitoku et al. . | |
| 4,718,272 | 1/1988 | Plapp . | |
| 4,719,795 | 1/1988 | Eitoka et al. . | |
| 4,743,882 | 5/1988 | Simon . | |
| 4,812,803 | 3/1989 | Hochholzer . | |
| 4,827,884 | 5/1989 | Cook . | |
| 4,866,981 | 9/1989 | Matsumoto et al. . | |
| 4,933,661 | 6/1990 | Oda et al. . | |
| 5,070,728 | 12/1991 | Kubota et al. . | |
| 5,133,321 | 7/1992 | Hering et al. . | |
| B1 4,355,293 | 9/1985 | Driscoll . | |

FOREIGN PATENT DOCUMENTS 5870104 10/1981 Japan .

*Primary Examiner*—Robert Raevis
*Attorney, Agent, or Firm*—Albert W. Watkins

[57] ABSTRACT

The rotor of a rotary position sensor mounts directly upon the rotary shaft to be sensed. The rotor prior to installation is retained in position by a pair of small protrusions extending from the rotor that cooperatively engage a pair of small indentations formed in a pair of supporting arms. During the installation process, the rotor is slipped onto the shaft and the protrusions are released from the engaged position. During operation of the position sensor, the rotor is free from direct contact with either the supporting arms or any other stationary part of the position sensor. Only the contactors engage the stationary components. This design eliminates the need for bearings and return springs prevalent in the prior art.

4 Claims, 12 Drawing Sheets

BEARING FREE SPRING FREE THROTTLE POSITION SENSOR

This application is a division of application Ser. No. 08/082,140, filed Jun. 23, 1993, now U.S. Pat. No. 5,460, 035.

CROSS REFERENCE TO RELATED APPLICATIONS

This application is related to and incorporates by reference the copending applications entitled "Pin Locator for Factory Zero Set Sensors" and also "Rotor Structure for a Position Sensor," each invented in part by David S. Pfaffenberger.

BACKGROUND OF THE INVENTION

1. Field of the Invention

This invention pertains to variable resistor position sensors.

2. Description of the Related Art

Many internal combustion engines use a throttle valve to control the amount of air entering the engine. The throttle valve is also commonly called a butterfly or throttle flap. Throttle valves are used in gasoline, diesel and other alternatively fueled vehicles. The throttle valve may be opened to provide unimpeded air intake through a throttle body. Alternatively, the throttle valve may be closed to greatly restrict the passage of air. By controlling the amount of air that reaches the combustion chamber, the throttle valve forms part of the primary engine speed control. The throttle valve may be mechanically linked to the accelerator pedal or, in some instances, linked through a combination of electrical and mechanical interconnections.

There are many efforts to improve the efficiency of internal combustion engines and similarly to reduce the emissions, or pollutants, that are produced by these engines. A vital part of better efficiency and reduced emissions is the electronic control circuitry used with the engines. The electronic circuitry monitors various engine parameters and provides feedback or controls to the engine. The feedback may be a signal which in some way improves efficiency or reduces emissions. The signal may, for example, be used to control the amount of fuel injected into the engine or the timing of ignition sparks.

A potentiometer is often used to sense the position of the throttle valve. This potentiometer is in some ways similar to the volume controls used in radio and television receivers. A voltage is applied across two extreme ends of a resistor. An intermediate tap is provided between the two extremes of the resistor. The tap is mechanically linked to the device which is to be sensed, and the position of the device is determined by the voltage at the intermediate tap.

There are several stringent requirements placed upon a throttle position sensor that make it different from a volume control. Since the throttle valve is used to control air intake and thereby represent a demand for power, binding of the throttle shaft in an open throttle position could result in life threatening situations. Safety and reliability are essential in automotive applications.

The automotive environmental requirements are also different from a radio or television receiver. The throttle position sensor must reside against the throttle body. Temperatures might, for example, range from −55 to +150 degrees celsius. Further, the device may be exposed to a number of solvents, road spray, and other adverse conditions associated with engine compartment environments. These requirements diverge greatly from the typical volume control.

Examples of conventional throttle position sensors include U.S. Pat. No. 4,430,634 by Hufford et al and assigned to the present assignee and also U.S. Pat. Nos. 4,355,293 by Driscoll and 5,133,321 by Hering et al, incorporated herein by reference. Other examples may be found in U.S. Pat. Nos. 4,616,504, 4,621,250, 4,688,420, 4,703,649, 4,715,220, 4,719,795, 4,743,882, 4,812,803, 4,933,661, 5,133,321, and Japanese Kokai 58-70104, also incorporated herein by reference.

In the prior art, a lever such as shown in U.S. Pat. Nos. 4,355,293 and 4,430,634 or special drives such as shown in U.S. Pat. No. 4,616,504 were used. These drives ensure that, even in the event of malfunction, the throttle sensor will not retain the throttle valve in an acceleration position, but instead will allow the throttle valve to return to an idle. Engagement between the sensor and the throttle shaft has then necessitated the use of a return spring so that as the throttle shaft returns to idle position, the throttle position sensor also returns and tracks the position of the throttle valve.

The throttle position sensor in the prior art is a free-standing, rather self-contained device. In addition to the return spring, a well-sealed package including the associated bearings is typically provided. Significant effort was directed at designing a package that was sealed against the adverse chemicals and moisture that might otherwise damage the sensor.

Inclusion of the spring and bearings into this sealed package has drawbacks. The use of springs requires a fairly robust design. Springs and bearings add expense to the device and increase the cost and hazards of assembly. Additionally, any wear debris that may result from the spring or bearings may be detrimental to the operation of the position sensor.

Other prior art sensors incorporate the sensor directly into the throttle body. Exemplary of this concept are U.S. Pats. Nos. 4,649,367, 4,672,356, 4,693,111, 4,718,272, 4,827,884, 4,866,981 and 5,070,728 incorporated herein by reference. This concept offers advantage in simplicity. However, there is little control over the element contactor interface, which has been determined to be very important for the life of the unit.

Variations in contact pressure, contact orientation, lube and other similar factors all impact the performance of the device. Further, field replacement is important for service repair, and the service replacement should be of the same quality as the original device. These throttle body incorporated sensors do not have the precise control over lube thickness and composition, protection of vital components while shelved awaiting installation, and control over contactor and element relationships that are desirable features.

The shape of the contactor structure is, for obvious reasons, critical to the performance of the device. Where contactor rakes are used, a bent rake may reduce the life of the device to less than one hundredth the normal life. Yet, in those devices that mount into the throttle wall, the contactor will be exposed during shipment of service parts and will be handled to an undesirable degree during installation.

With electronics becoming more prevalent, the ability to sense various engine functions and also in some instances non-engine or indirect engine functions is more desirable. The present invention seeks to overcome the limitations of the prior art sensors and offer a throttle position sensor that delivers unmatched performance without compromise. Further, while the preferred embodiment is certainly throttle position sensing, the inventive features are applicable to position sensors in other applications, including but not limited to accelerator pedal position sensing, machine and industrial robot position sensing, and other applications for potentiometric devices of high quality and reliability.

SUMMARY OF THE INVENTION

A rotary potentiometric device includes a sensor element traversed by a contactor. Prior to final installation the contactor and rotor are supported by a unique retaining mechanism that protects the integrity of the device post-production and pre-installation. At the time of installation, the rotor is released from the retaining mechanism, so the rotor will freely follow a rotary shaft. The combination of features uniquely protects the device after production while eliminating the need for bearings and springs found in the prior art.

DESCRIPTION OF THE PREFERRED EMBODIMENT

Figure 1:
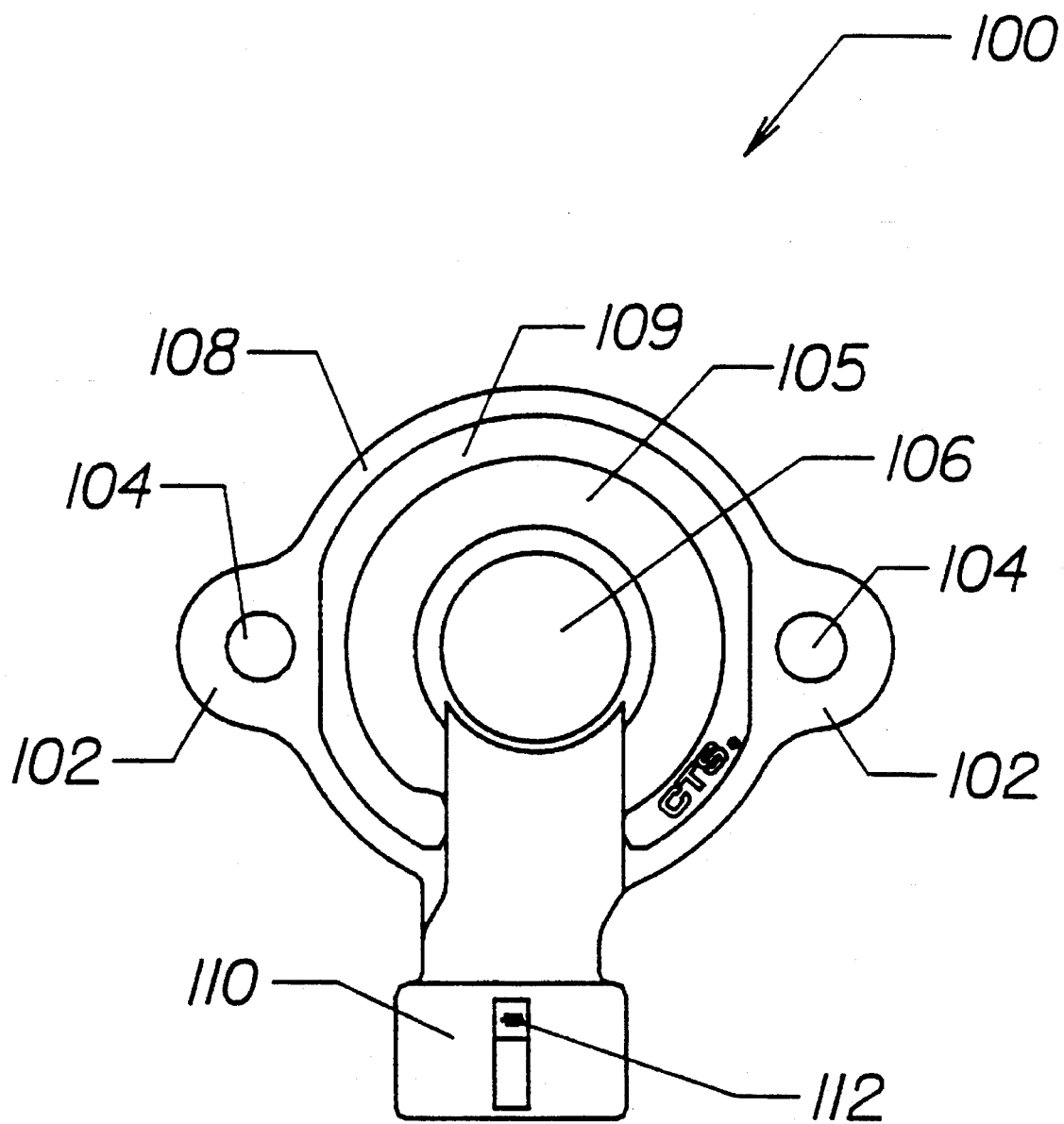
FIGS. 1–3 illustrate the preferred embodiment from a top, side and end view, respectively, in a pre-installed configuration.

FIGS. 1–5 illustrate a preferred embodiment of the invention. These illustrations are provided as an example of the invention, but are in no way intended to limit the scope of the invention. Many design features and applications for the invention will occur to one of ordinary skill in the art after a review of these illustrations. Similar numbering has been used across all drawing figures where like components are shown, to simplify description and review of the preferred embodiment.

The position sensor is designated generally by the numeral 100. Sensor 100 is shown in an "as manufactured" condition prior to installation in FIGS. 1–3. O-ring 180 is not illustrated for exemplary purposes. Sensor 100 includes mounting ears 102 with holes 104 therethrough. Holes 104 are used by attachment devices (not shown) such as bolts to pass through and attach to a throttle body (not shown). Ears 102 provide easy access, particularly where a hex head type bolt is used. A rim 108 is provided generally at the outer periphery of sensor 100. Adjacent rim 108 is a groove 109. Rim 108 and groove 109 provide a relatively stiff periphery to sensor 100, much as an I-beam would, while not consuming an excess of material in the manufacture. A dome 105 rises from rim 108 and groove 109, forming a wall of the sensor chamber. A second dome 106 rises from dome 105, forming an outer wall of the rotor chamber. Sensor 100 at a bottom thereof includes an electrical connector wall 110 of generally cylindrical configuration, with a protrusion 112 extending therefrom. Protrusion 112 forms a polarizing key to ensure a mating electrical connector (not shown) is inserted properly. Additionally, protrusion 112 forms a positive mechanical latch to help retain the mating connector in an engaged position.

Figure 2:
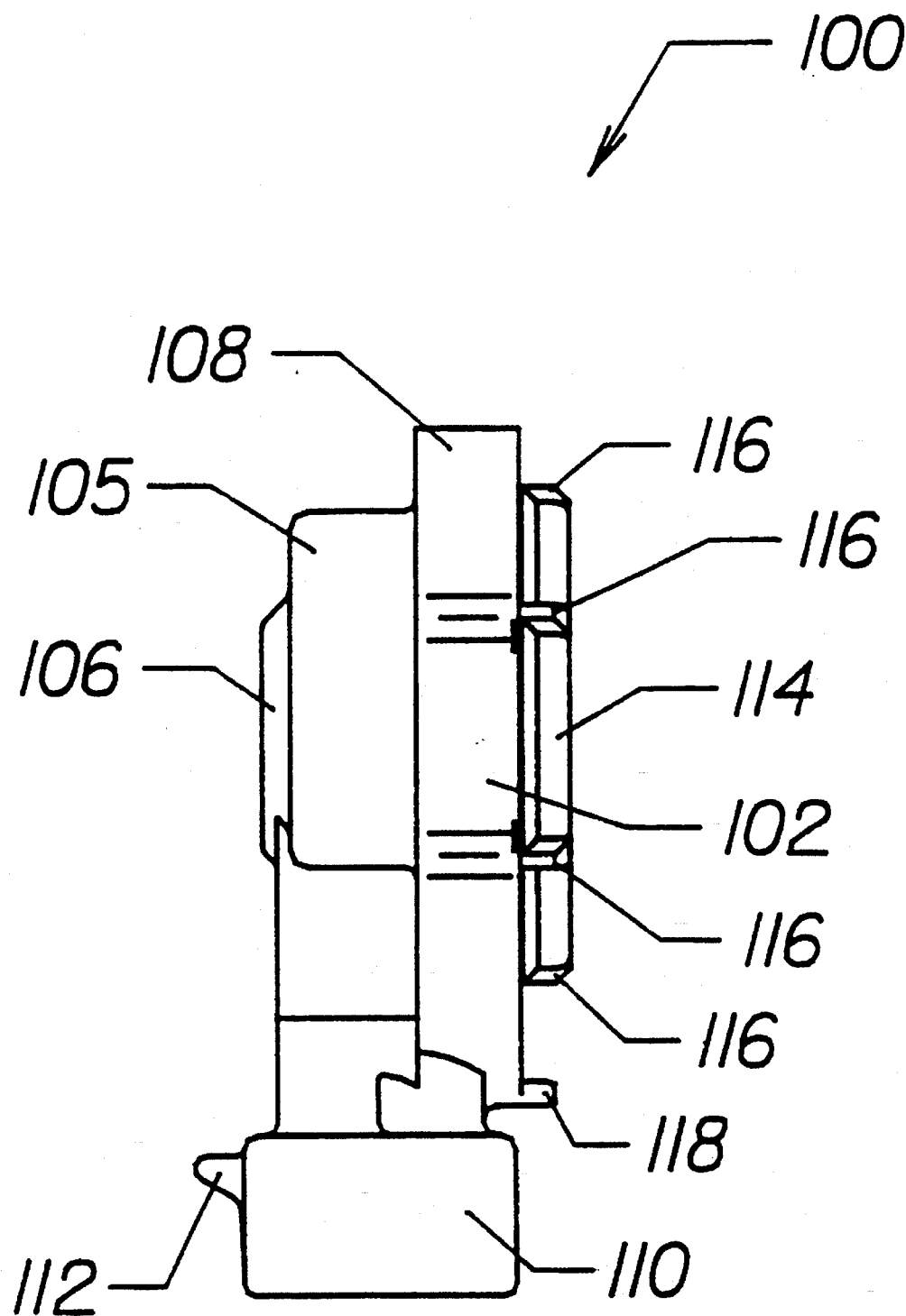
Figure 3:
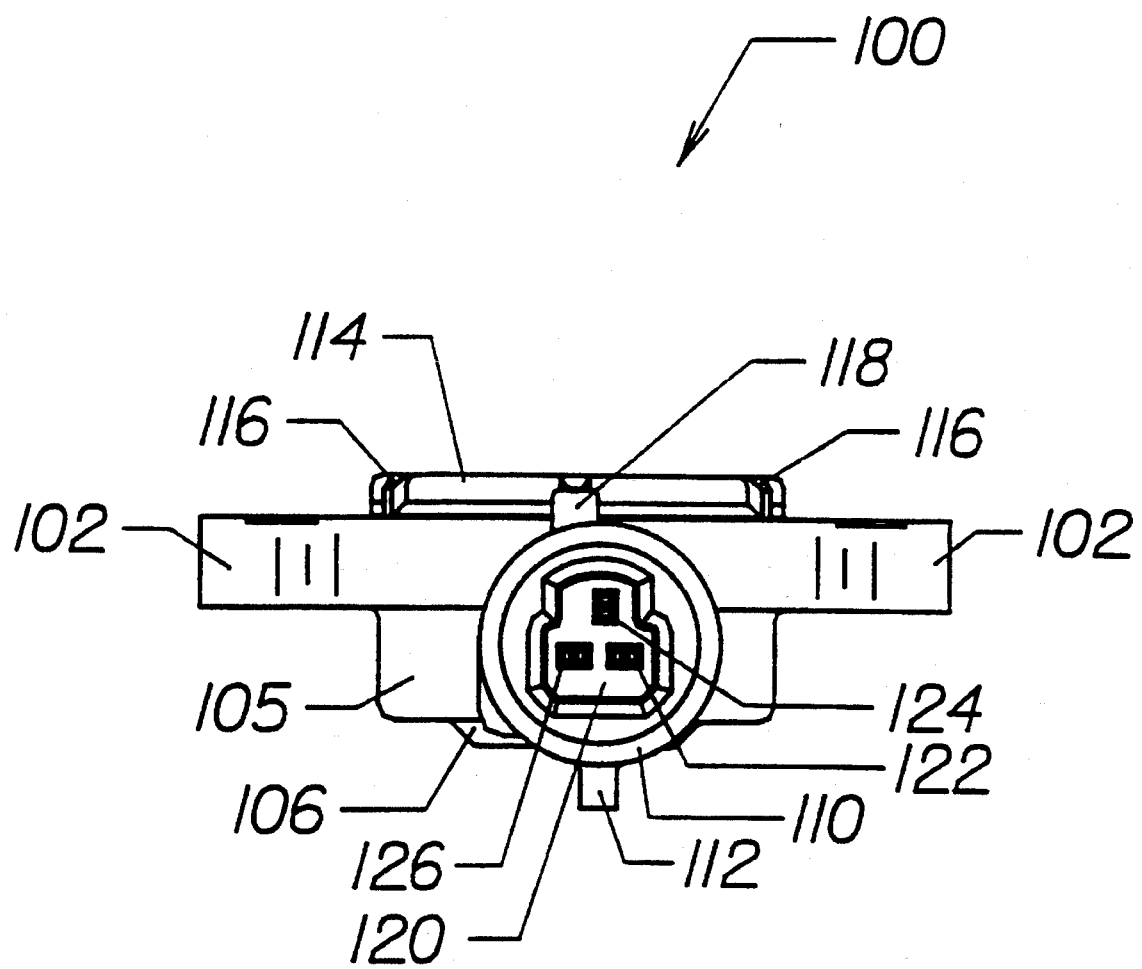

In FIGS. 2 and 3 several features are visible which were not visible in FIG. 1. Adjacent to electrical connector wall 110 is locating pin 118. This pin 118 establishes part orientation upon the throttle body. As described in the copending application entitled "Pin Locator for Factory Zero Set Sensors" and incorporated herein by reference, pin 118 may also serve additional purposes.

At the time of installation, an installer will likely be viewing the sensor 100 from an orientation similar to that shown in FIG. 1, which is referenced herein as "top" for convenience purposes. The part will be mounted against a throttle body, with the "bottom" or side opposite that of FIG. 1 pressed or abutted with the throttle body. Locating pin 118 would insert into a mating hole, while fasteners would extend through ears 102 in holes 104 and be fastened to some structure upon the throttle body. Assuming the fasteners to be bolts, the bolts would then be tightened down against ears 102, bringing sensor 100 tight against the throttle body. To assist with initial alignment of the many mating features, sensor 100 further includes tapered guides 116 on the outer circumference of lip 114.

Electrical connector wall 110 partially encloses electrical connector terminals 122, 124 and 126. While male blades are illustrated, there are a wide variety of known types of suitable electrical connectors. Surface 120 may be formed integrally with the housing around the electrical connector terminals 122, 124 and 126, preferably in a sealed way to exclude dirt and other contaminants.

Figure 4:
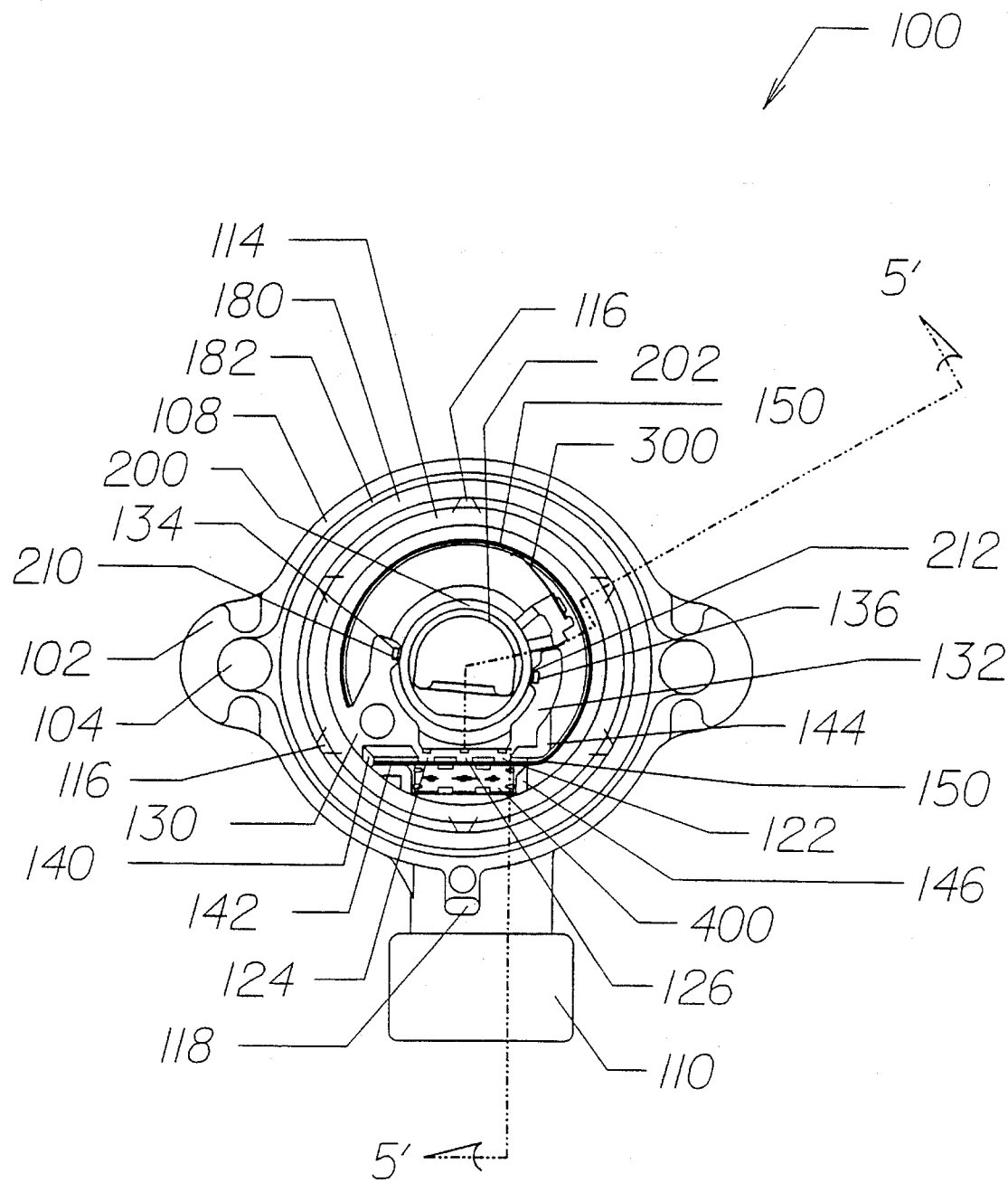
FIG. 4 illustrates the same embodiment as shown in FIG. 1, from a bottom view with the cover removed to make the internal features visible.
Figure 5:
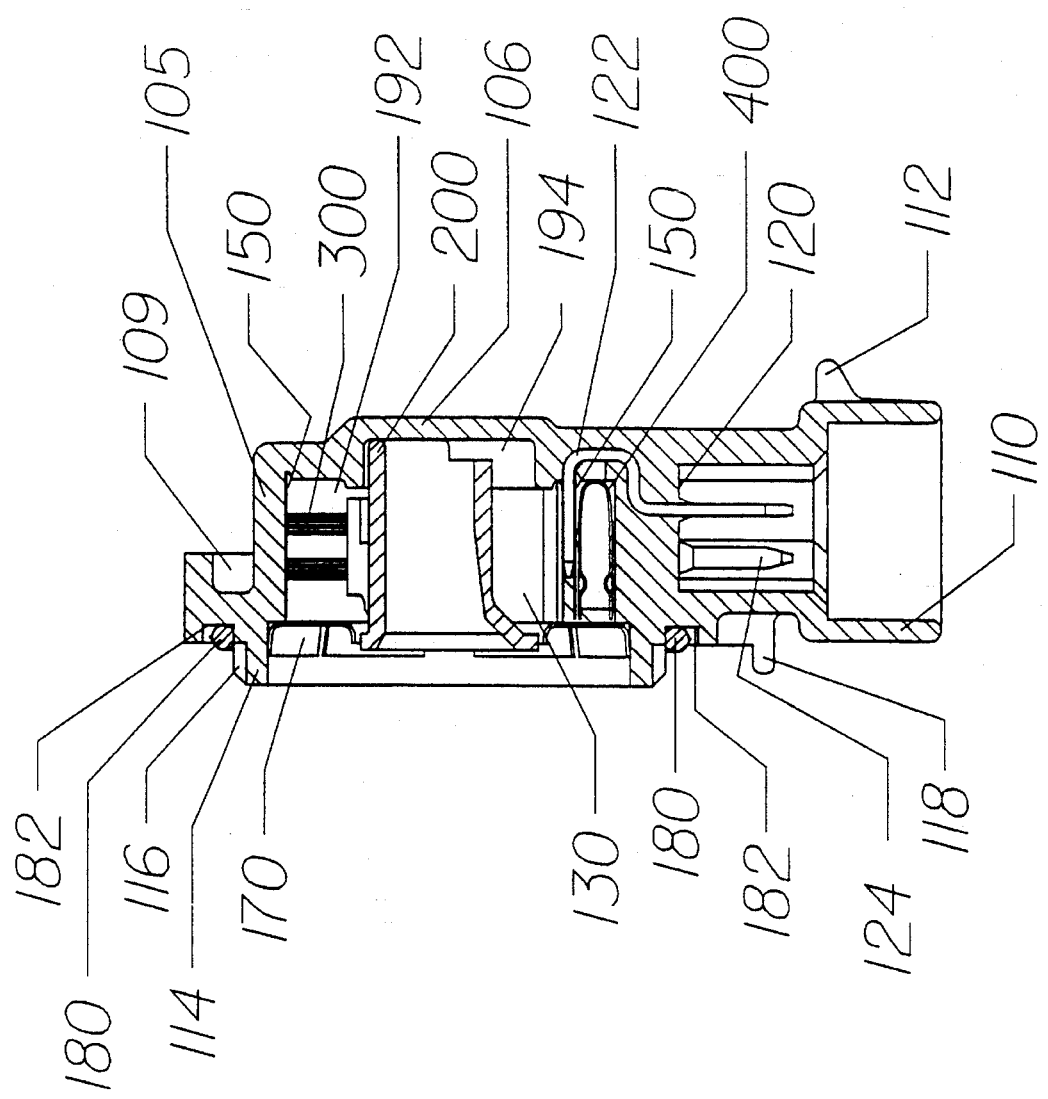
FIG. 5 illustrates the same embodiment as shown in FIG. 1 from a cross section view.

FIGS. 4 and 5 illustrate the sensor 100 with alterations for viewing purposes that make these parts different from the "as manufactured" views of FIGS. 1–3. In FIG. 4, cover 170 (visible in FIG. 5) is removed to allow a complete view of the internal components. FIG. 5 shows a cutaway view of sensor 100 taken along section line 5' of FIG. 4. To avoid duplication, like numbering has been used as in FIGS. 1–3, so already discussed components will not be repeated herein.

The view in FIG. 4 is from the "bottom" side, or the side that will be mounted against the throttle body. As noted, cover 170 is removed to allow a view of each of the internal components. Central in FIG. 4 is rotor structure 200 carrying thereon contactor structure 300. The details of each of these structures will be discussed elsewhere.

On a periphery of rotor 200 are two small protrusions 210 and 212. These protrusions 210 and 212 at the time of manufacture are engaged with indentations 134 and 136, respectively of arms 130 and 132, respectively. At the time of installation, a throttle shaft (not shown) will be inserted into throttle shaft opening 202. The sensor 100 will then be rotated just a few degrees, thereby releasing rotor structure 200 from any contact with arms 130 and 132. The sensor 100 is then pressed towards the throttle body, using locating pin 118 and tapered guides 116 to help align sensor 100 to the throttle body. As long as protrusions 210 and 212 mate with indentations 134 and 136 outside the operating range of the sensor, no obstructions are present during sensor operation. Additionally, once rotor 200 is released from arms 130 and 132, rotor 200 is supported entirely upon the throttle shaft.

Having a rotor supported entirely by the throttle shaft creates several advantages, but not without issues that need addressed. A significant advantage is the lack of need for a return spring or bearing within the sensor package. This eliminates wear debris, reduces rotational torque, and does not impact adversely upon the return spring of the throttle shaft which provides the feel of the accelerator to the engine operator.

However, the bearing in the prior art formed one part of an enclosed package that allowed the prior art sensors to be freestanding and environmentally protected. In the preferred embodiment, this issue is addressed in part by O-ring channel 182 and O-ring 180, both which are most visible in FIG. 5. O-ring 180 is deformed and retained between sensor 100 and the throttle body (not shown) at the time of installation. This O-ring provides a seal between the throttle body and sensor 100, thereby protecting the internal portions of sensor 100 from the remainder of the engine compartment. O-ring channel 182, groove 109 and rim 108 form an I-beam type construction, providing sufficient structural integrity to ensure good compression of O-ring 180.

The resistive element 150 is typically formed by screen printing conductive polymers upon a Kapton™ film, though the materials that make up element 150 are not the essential features of this invention. The Driscoll and other similar patents adequately illustrate the features of this type of element construction. Resistive element 150 is inserted into the housing, generally within and against dome 105. One end of element 150 is captured in a pocket 142 comprised generally by U-shaped wall 140 on a first end of pocket 142 and two guide pieces 144 and 146 on an opposite end of pocket 142. In practice, element 150 would typically be inserted into pocket 142 first at U-shaped wall 140 and then slid down between guide pieces 144 and 146. Pocket 142 serves to guide the insertion of element 150 during assembly and also serves as a positive method for positioning the terminal end of element 150. Positioning is important since element 150 must be connected through relatively small terminations to connector terminals 122, 124 and 126. Once element 150 is inserted into pocket 142, pressure wedge 400 is pressed into pocket 142, forcing element 150 against the exposed portions of connector terminals 122, 124 and 126. By virtue of this compression, sound electrical contact resistant to vibration is ensured.

The specific geometry of guides 144 and 146 is significant in ensuring correct deformation of element 150 while preventing element 150 from sagging into the region where wedge 400 will be inserted. Too sharp a bend in element 150 could result in destruction of the resistive and conductive coatings patterned thereupon, while an insufficient bend will result in element 150 curving within pocket 142, exposing element 150 to the possibility of being crushed upon insertion of wedge 400.

FIG. 5 shows by cross-section view the inside or sensor 100. Many of the elements have already been described and will not be repeated here. However, cover 170 is shown in the installed position. From the drawing it is apparent that the interior opening of cover 170, closest to rotor 200, has a diameter somewhat larger than required for rotor 200. This provides a small amount of radial tolerance to the throttle shaft axial center. This is in case the rotor 200 center is, prior to installation, not in exact axial alignment with the throttle shaft. Opening 168 also limits radial motion of rotor 200 prior to throttle body installation, thereby preventing damage.

Also visible in FIG. 5 are the chambers 192 and 194 formed by domes 105 and 106, respectively. Within chamber 192 is element 150, contactor 300, and, in most cases, an amount of lubricant (not shown) upon element 150.

During installation, the sensor 100 is pressed towards a throttle shaft. The throttle shaft should pass through throttle shaft opening 202, but in order to do so, rotor structure 200 must be forced towards the throttle shaft. This force may be applied by axially moving the throttle shaft towards dome 106. The force is then transmitted through the inner portion of dome 106 to rotor 200, causing dome 106 and rotor 200 to be in contact as illustrated in FIG. 5. After installation the throttle shaft will be returned to a natural axial position, causing rotor structure 200 to move away from dome 106. Ideally, rotor 200 will then be separated from any direct contact with dome 106.

While throttle shafts typically suffer very little from radial motion (which would result in rotor 200 being moved closer to one part or another of cover 170), the shaft will typically have a fair amount of axial motion. This axial motion will be translated into the contactor being moved transversely across the resistor tracks, which will not result in any change in output position sensing. This is as it should be. To maintain this integrity, resistors and conductors upon element 150 should be patterned to be wide enough so that axial motion of the throttle shaft will not cause contactor 300 to move off of the conductive patterns.

Figure 6:
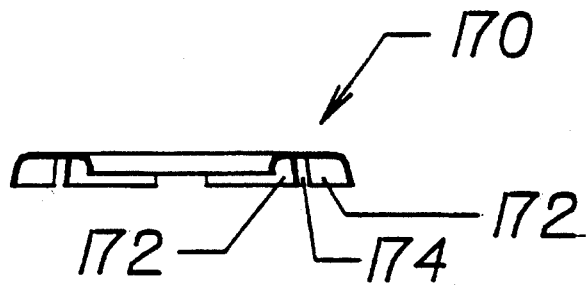
FIGS. 6–8 illustrate the cover from side, end and bottom views, respectively.
Figures 7, 8:
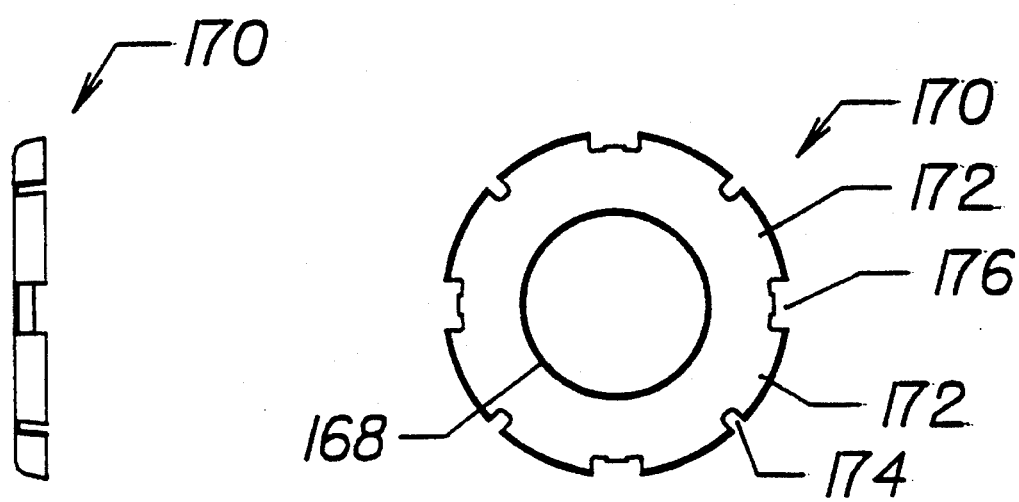
Figure 9:
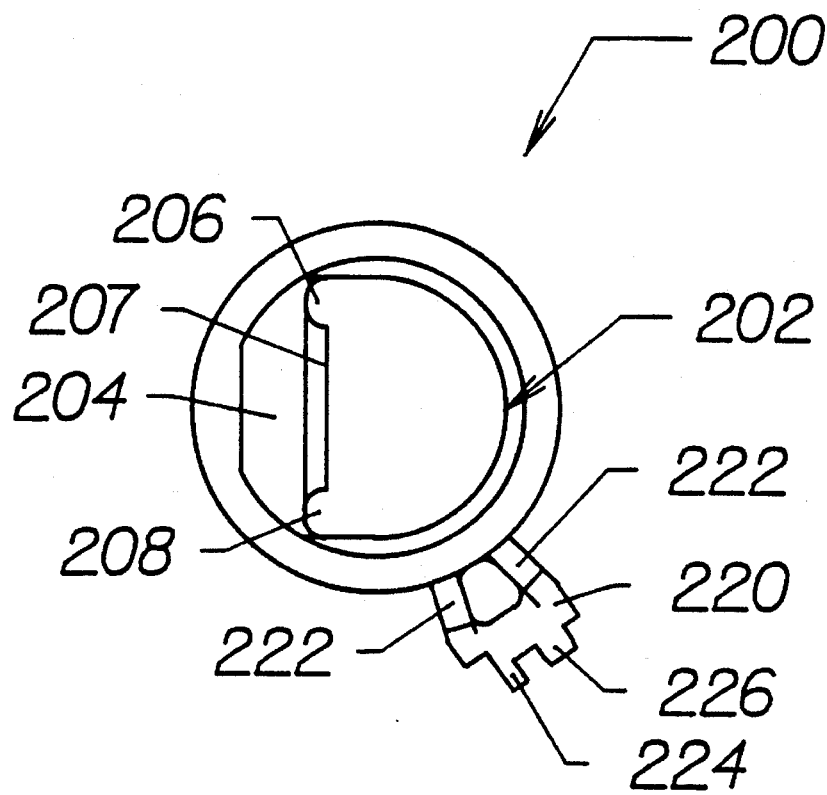
FIGS. 9–12 illustrate the rotor without contactor from a bottom, side, top and cross-section view, respectively.
Figure 10:
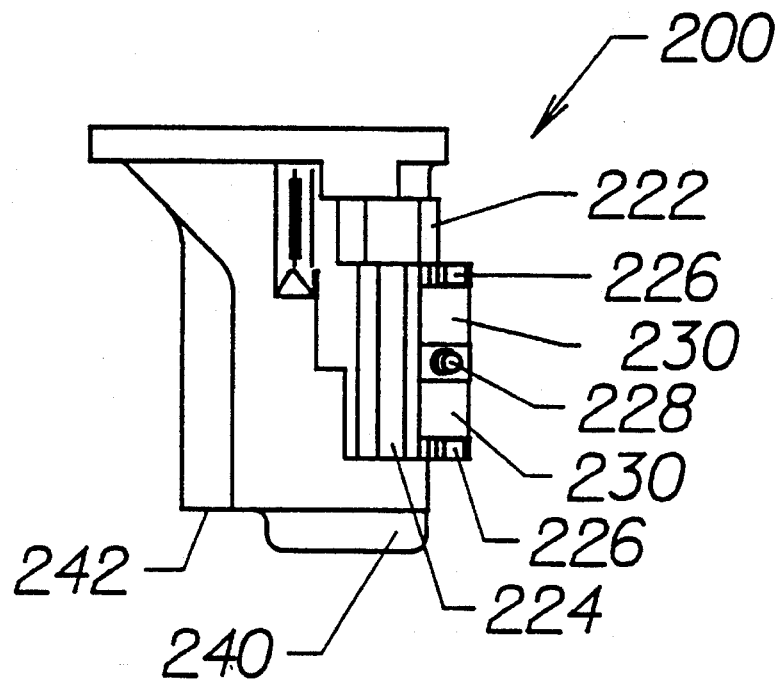
Figure 11:
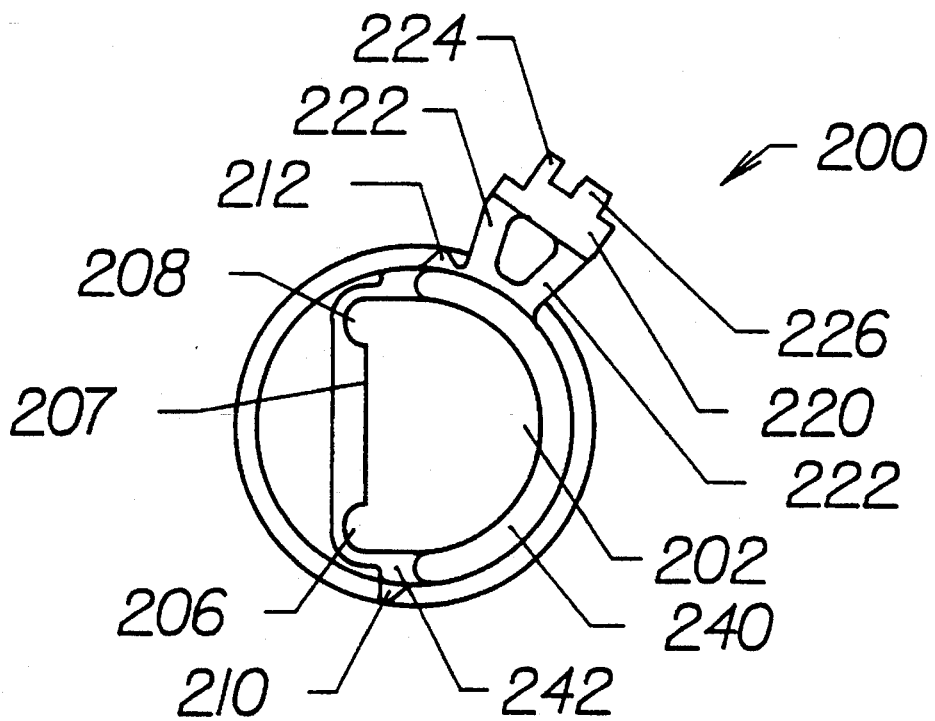
Figure 12:
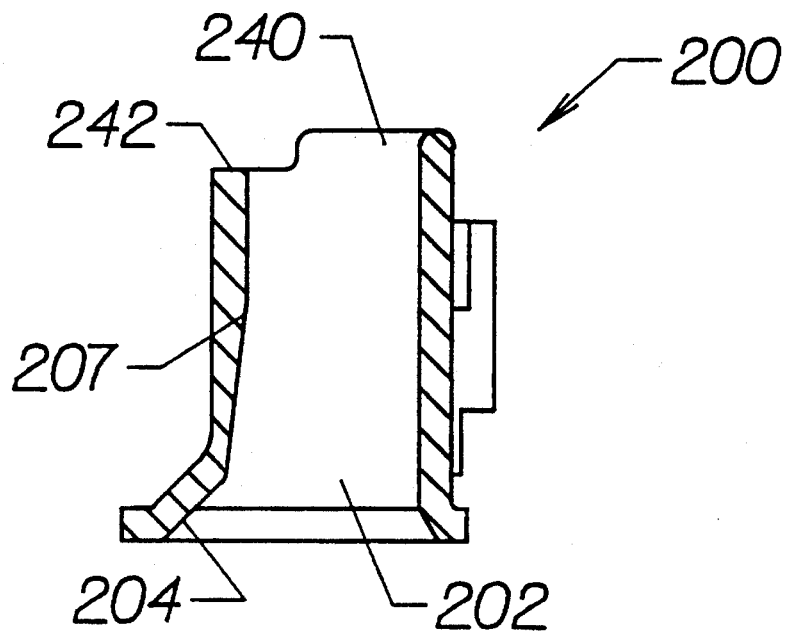

FIGS. 6–8 illustrate the cover from side, end and bottom views, respectively. Cover 170 has therein a large center hole 168 of slightly larger diameter than the part of rotor structure 200 fitting therethrough. Additionally, cover 170 has curved tabs 172 with spaces 174 and 176 interspersed between each tab 172. Tabs 172 form a flexible one-way engaging mechanism to engage the inner circumference of lip 114. During installation, cover 170 is pressed into lip 114 and tabs 172 resiliently flex towards the center of cover 170. However, removal of cover 170 is prevented by tabs 172 biting into lip 114. Cover 170 could be made from a variety of materials, although a slightly resilient metal is preferable.

Rotor structure 200 is illustrated in FIGS. 9–12. Rotor structure 200 includes a throttle shaft opening 202. At a first end of opening 202 is a tapered surface 204 which serves to facilitate alignment of throttle shaft with rotor structure 200. At an end of opening 202 opposite tapered surface 204 is a slight extension 240. Extension 240 provides a bearing surface of less than full circle through which force may be applied to force rotor structure 200 onto a throttle shaft. Extension 240 extends beyond end 242 of opening 202 so that if there is undesired drag between rotor structure 200 and dome 106, that this be minimized. Additionally, extending axially with opening 202 are two long grooves 206 and 208, and a compression wedge 207. Compression wedge 207 engages a flat upon the throttle shaft to ensure exact alignment between the rotor structure and the throttle shaft. Compression wedge 207 restricts opening 202 to a size just smaller than the shaft size, forcing rotor structure 202 to flex slightly to allow the throttle shaft to pass through. Grooves 206 and 208 provide lines of flexure while ensuring that compression wedge 207 is retained tightly against the flat of the throttle shaft.

Extending on an exterior circumference of rotor structure 200 are two arms 222 which join to form a contactor support block 220. Contactor support block 220 includes contactor support surfaces 230 for supporting a contactor such as contactor 300, with contactor alignment edge 224 and alignment stubs 226. In production, contactor 300 is set against surfaces 230 and is heat staked in place by thermally deforming small heat stake protrusion 228, edge 224 and stubs 226. This structure serves to support contactor 300 and ensures tracking between contactor 300 and the throttle shaft.

Figure 13:
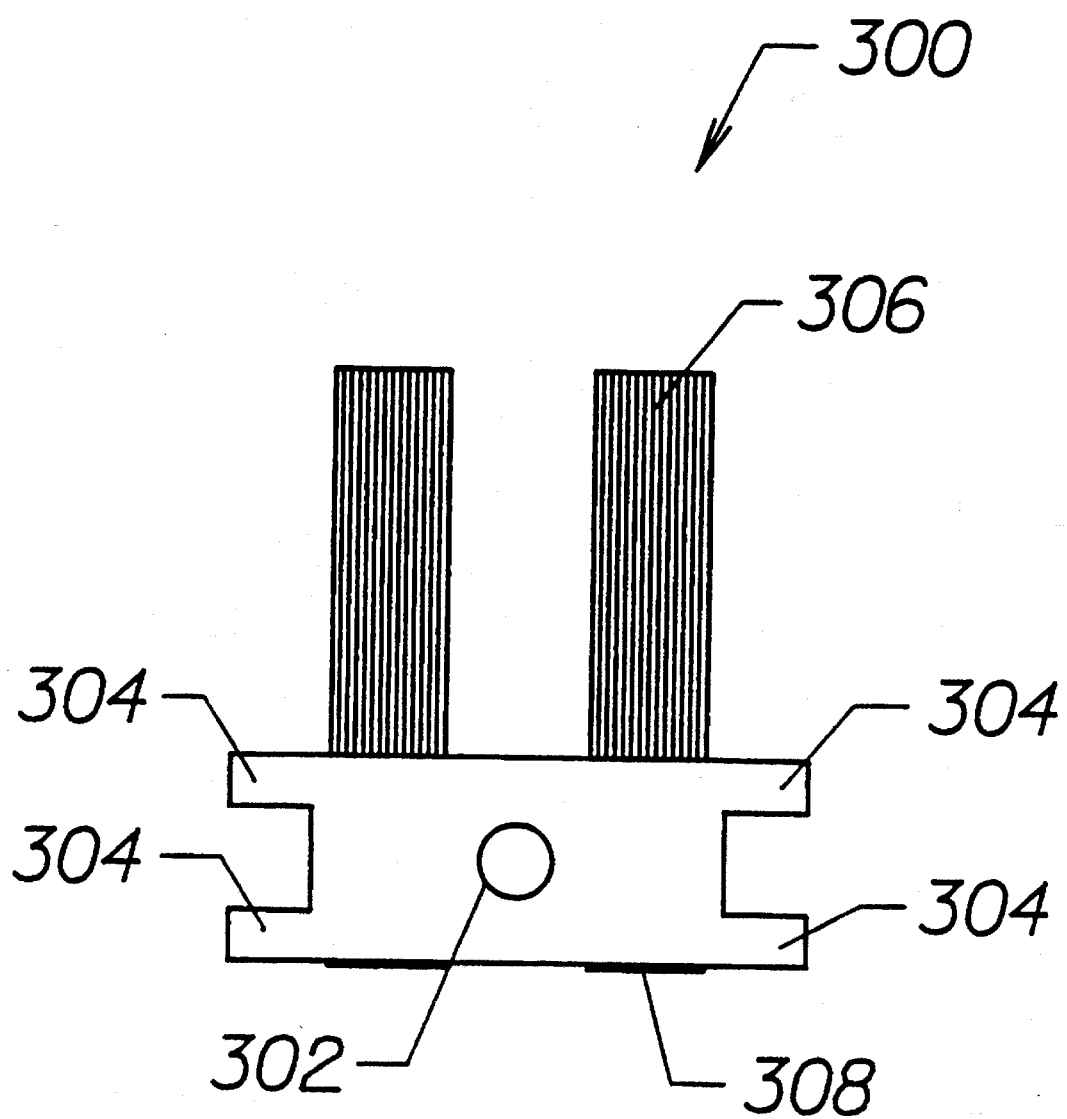
FIG. 13 illustrates a contactor structure suited for use with the rotor of FIGS. 9–12.
Figure 14:
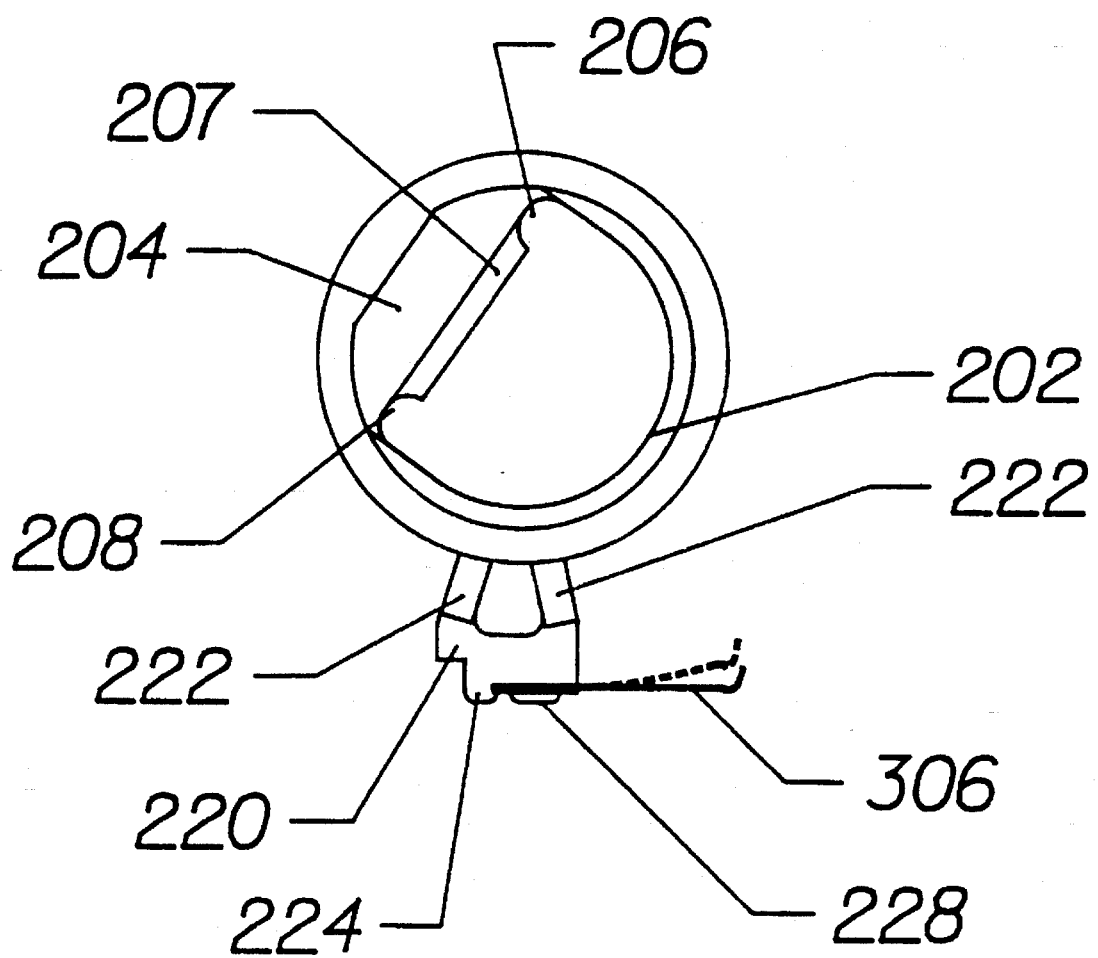
FIG. 14 illustrates the rotor and contactor in assembled configuration.

FIG. 13 illustrates contactor 300 in further detail and FIG. 14 illustrates rotor structure 200 interconnected to contactor 300. Contactor 300 is shown with brushes 306 protruding away from opposite edge 308, although it will be immediately apparent to those skilled in the art that brushes are but one of many choices available for contactor structures. Other configurations include paddles, spoons, rakes, multi-fingered contacts, blades, and others. There are four small tabs 304 that engage with and partially surround on three sides alignment stubs 226. The center of contactor 300 has a small hole 302 through which fits heat stake protrusion 228. In assembly, edge 308 of contactor 300 is abutted with alignment edge 224. Hole 302 is aligned with heat stake protrusion 228, while alignment stubs 226 are centered between tabs 304. The contactor 300 is then pressed down against surfaces 230 and heat stake protrusion 228, edge 224 and stubs 226 are formed down to retain contactor 300 in place against surfaces 230.

FIGS. 15-18 illustrate the pressure wedge 400 in more detail. Wedge 400 is formed from a resilient material with high spring retention. Such materials might include beryllium copper, phosphor bronze, spring steel and other similar materials. Plastics might also be used, although a sufficient spring force must be generated to ensure sound electrical contact through temperature extremes.

Figure 17:
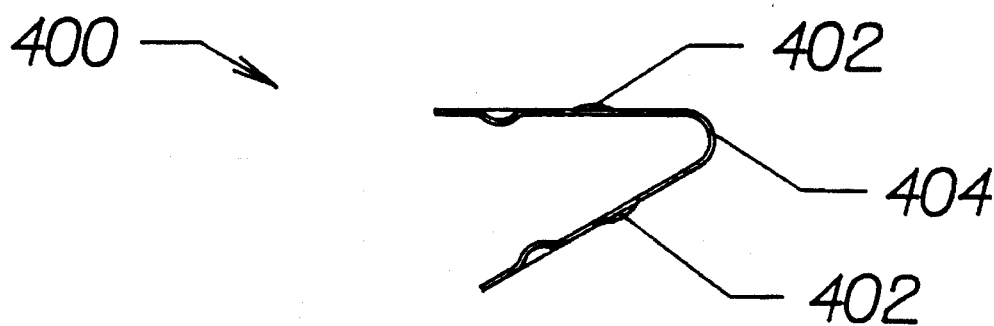
Figure 18:
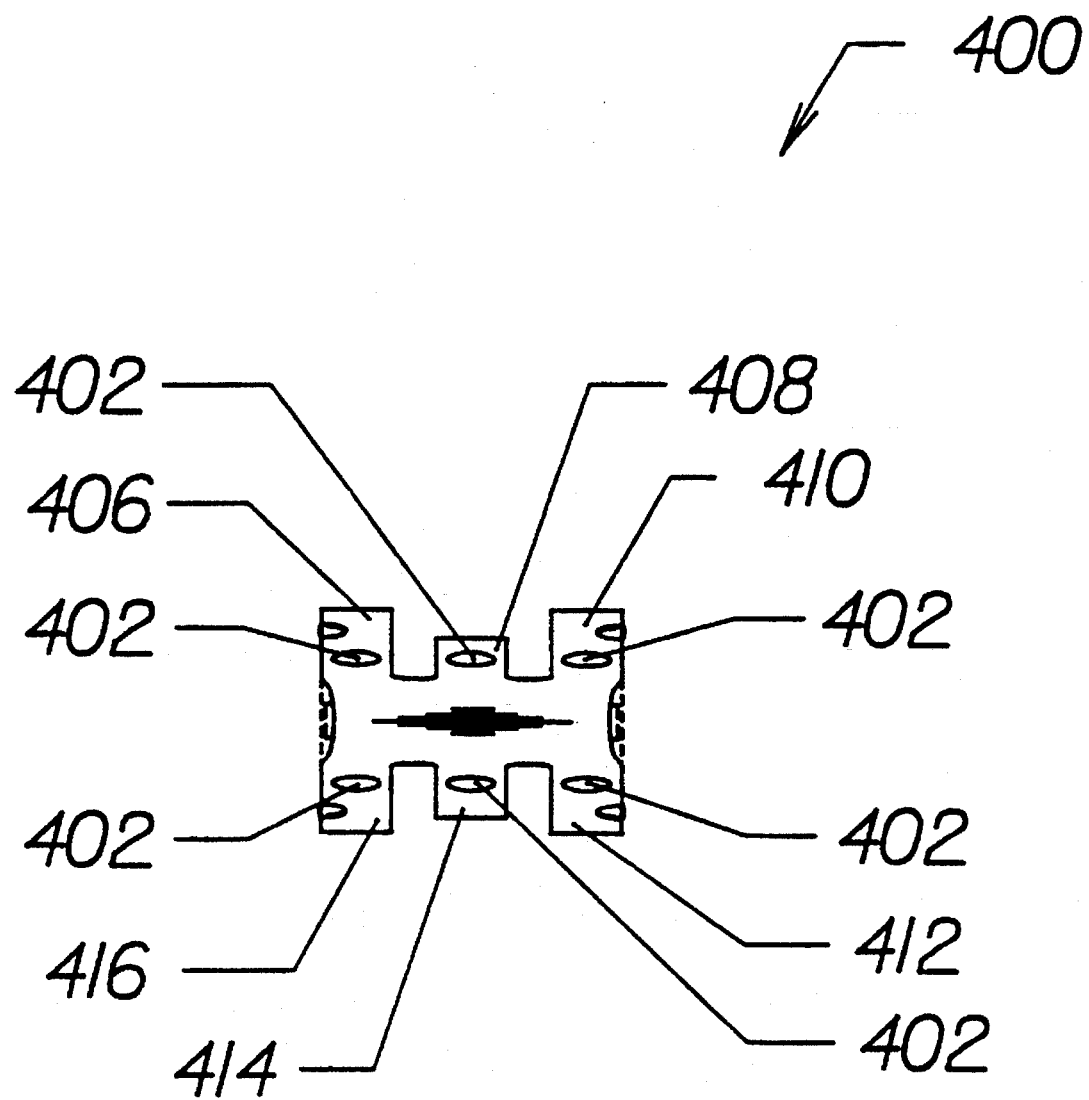

Wedge 400 has several protrusions 402 extending therefrom. Protrusions 402 act as force concentrators and so are designed to press particularly against the resistive element 150 only in those places where element 150 is to make sound electrical contact with electrical connector terminals 122, 124 and 126. In an uncompressed state, wedge 400 takes on a v-shape form side view, as illustrated in FIG. 17. The base 404 of the wedge is joined and forms approximately a 30 degree include angle. Since there are three electrical connector terminals 122, 124 and 126 in the preferred embodiment, there are six legs extending from base 404. While only two legs would be necessary at a minimum (one for each side of the "V" shape, adding a leg for each protrusion 402 provides resilience for each contact point independent of each other. This is of value in increasing the tolerance for slight differences in each termination. While strictly speaking, this still only accounts for a total of four legs, by adding six and making the wedge fully symmetrical, there is no need for special orientation of the wedge upon insertion. This eases the assembly operations required to insert wedge 400 into sensor 100.

Figure 15:
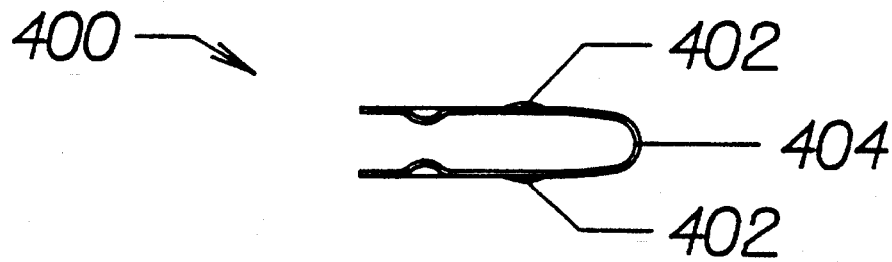
FIGS. 15–18 illustrate a suitable pressure wedge connector for use in the preferred embodiment.
Figure 16:
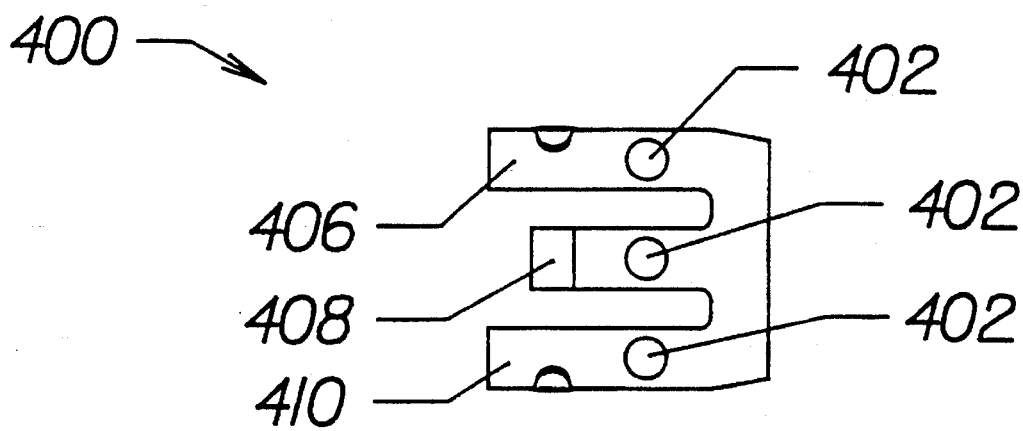

FIG. 15 illustrates the wedge 400 as it would appear inserted into pocket 142. The wedge in this compressed state takes on a more "U" shaped geometry, with protrusions 402 extending oppositely therefrom.

While the foregoing details what is felt to be the preferred embodiment of the invention, no material limitations to the scope of the claimed invention is intended. Further, features and design alternatives that would be obvious to one of ordinary skill in the art are considered to be incorporated herein. The scope of the invention is set forth and particularly described in the claims hereinbelow.

We claim:

1. A rotary position sensor for coupling to and sensing a rotary position of a device rotatable about a device axis, comprising:

a rotor means in a first position angularly rotated about a rotor axis relative to a first reference axis perpendicular to said rotor axis by a first angle and rotatable to a second position angularly rotated about said rotor axis relative to said first reference axis by a second angle;

a means for converting said second angle into an electrical signal indicative of a magnitude of said second angle;

a stationary means for supporting said rotor means in said first position, said stationary supporting means rotationally fixed relative to said first reference axis, wherein said rotor means is fully detached from said supporting means in said second position and is supported fully by said device while in said second position.

2. The rotary position sensor of claim 1 wherein said converting means comprises a resistor element extending from a first location to a second location.

3. The rotary position sensor of claim 2 wherein said converting means further comprises a contactor means for electrically contacting said resistor element at a contact location between said first and said second locations, said contact location representative of a position of said rotor means relative to said first reference axis.

4. The rotary position sensor of claim 3 wherein said contactor means derives a voltage of a first magnitude from said resistor element, said first magnitude indicative of said magnitude of said second angle.

* * * * *